US012652580B2

(12) United States Patent
Liu et al.

(10) Patent No.: US 12,652,580 B2
(45) Date of Patent: Jun. 9, 2026

(54) HANDOVER METHOD, PROCESSING METHOD, DEVICES, NETWORK DEVICE AND CORE NETWORK DEVICE

(71) Applicants:China Mobile Communication Co., Ltd Research Institute, Beijing (CN); China Mobile Communications Group Co., Ltd., Beijing (CN)

(72) Inventors: Liang Liu, Beijing (CN); Nan Li, Beijing (CN); Xiaodong Xu, Beijing (CN); Nan Hu, Beijing (CN); Xiaoman Liu, Beijing (CN)

(73) Assignees: China Mobile Communication Co., Ltd Research Institute, Beijing (CN); China Mobile Communications Group Co., Ltd., Beijing (CN)

( * ) Notice: Subject to any disclaimer, the term of this patent is extended or adjusted under 35 U.S.C. 154(b) by 655 days.

(21) Appl. No.: 18/009,032

(22) PCT Filed: Jun. 10, 2021

(86) PCT No.: PCT/CN2021/099320
§ 371 (c)(1),
(2) Date: Dec. 8, 2022

(87) PCT Pub. No.: WO2021/249464
PCT Pub. Date: Dec. 16, 2021

(65) Prior Publication Data
US 2023/0300681 A1　　Sep. 21, 2023

(30) Foreign Application Priority Data

Jun. 10, 2020　(CN) .......................... 202010523600.1

(51) Int. Cl.
　　*H04W 36/00*　　　(2009.01)
　　*H04W 36/08*　　　(2009.01)
　　*H04W 36/38*　　　(2009.01)

(52) U.S. Cl.
　　CPC ....... *H04W 36/0007* (2018.08); *H04W 36/08* (2013.01); *H04W 36/38* (2013.01)

(58) Field of Classification Search
　　CPC . H04W 36/0007; H04W 36/08; H04W 36/38; H04W 36/0055; H04W 36/0011
　　See application file for complete search history.

(56) References Cited

U.S. PATENT DOCUMENTS

2007/0293249 A1　12/2007　Wang
2009/0201884 A1　8/2009　Chaponniere
　　　　　　　(Continued)

FOREIGN PATENT DOCUMENTS

CN　　　101227745 A　　7/2008
CN　　　101267593 A　　9/2008
　　　　　　　(Continued)

OTHER PUBLICATIONS

Ericsson, "Ki #1, New Sol: Xn Handover of MB Sessions", S2-2003680, SA WG2 Meeting #139E, Jun. 1-12, 2020, Electronic Meeting.
(Continued)

*Primary Examiner* — Ricky Q Ngo
*Assistant Examiner* — Kabir U Jahangir
(74) *Attorney, Agent, or Firm* — Price Heneveld LLP

(57) ABSTRACT

A handover method, a processing method, a handover device, a processing device, a network device and a core network device are provided. The handover method includes: transmitting a handover request message to a second network device, the handover request message carrying relevant information of a first MBS; and receiving a handover request acknowledgement message transmitted by
(Continued)

the second network device, the handover request acknowledgement message carrying access control-related information of the first MBS.

14 Claims, 4 Drawing Sheets

(56)                References Cited

U.S. PATENT DOCUMENTS

| | | | |
|---|---|---|---|
| 2010/0296476 A1 | 11/2010 | Li et al. | |
| 2013/0039251 A1 | 2/2013 | Wilkinson et al. | |
| 2013/0107790 A1* | 5/2013 | Lee | H04W 72/566 |
| | | | 370/312 |
| 2014/0003322 A1 | 1/2014 | Grinshpun et al. | |
| 2014/0050082 A1 | 2/2014 | Sun et al. | |
| 2014/0050138 A1 | 2/2014 | Wang et al. | |
| 2014/0286222 A1 | 9/2014 | Yu et al. | |
| 2016/0157065 A1 | 6/2016 | Lee et al. | |
| 2016/0211980 A1 | 7/2016 | Zhu et al. | |
| 2016/0316398 A1 | 10/2016 | Han et al. | |
| 2018/0035265 A1 | 2/2018 | Kim et al. | |
| 2019/0394669 A1 | 12/2019 | Han et al. | |
| 2020/0323024 A1 | 10/2020 | Huang et al. | |
| 2021/0112379 A1 | 4/2021 | Ge et al. | |
| 2021/0352444 A1* | 11/2021 | Griot | H04W 28/0268 |
| 2023/0067900 A1* | 3/2023 | Jia | H04W 4/06 |
| 2023/0199569 A1* | 6/2023 | Cao | H04W 4/06 |
| | | | 370/331 |

FOREIGN PATENT DOCUMENTS

| | | | |
|---|---|---|---|
| CN | 101442714 A | 5/2009 | |
| CN | 101547409 A | 9/2009 | |
| CN | 101674526 A | 3/2010 | |
| CN | 101940028 A | 1/2011 | |
| CN | 102075867 A | 5/2011 | |
| CN | 102098624 A | 6/2011 | |
| CN | 102158918 A | 8/2011 | |
| CN | 102291688 A | 12/2011 | |
| CN | 102378113 A | 3/2012 | |
| CN | 102413431 A | 4/2012 | |
| CN | 102781057 A | 11/2012 | |
| CN | 102870461 A | 1/2013 | |
| CN | 103037463 A | 4/2013 | |
| CN | 104301959 A | 1/2015 | |
| CN | 104584634 A | 4/2015 | |
| CN | 104871570 A | 8/2015 | |
| CN | 105009638 A | 10/2015 | |
| CN | 105684473 A | 6/2016 | |
| CN | 108882334 A | 11/2018 | |
| CN | 110662270 A | 1/2020 | |
| KR | 20120122335 A | 11/2012 | |
| WO | 2008000130 A1 | 1/2008 | |
| WO | 2015100733 A1 | 7/2015 | |
| WO | 2019129212 A1 | 7/2019 | |

OTHER PUBLICATIONS

Huawei, Hisilicon, "KI#7, New Solution: Inter-RAN node MBS Session Handover", S2-2003966, 3GPP TSG SA2 Meeting #139E, Jun. 1-12, 2020, Elbonia.

Nokia Corporation, Nokia Siemens Networks, 3GPP TSG-RAN WG2 Meeting #61 R2-080697, On MBMS service continuity, Feb. 11-15, 2008, Sorrento, Italy.

Mediatek, 3GPP TSG-RAN2 #77bis Meeting R2-121112, MBMS UE Capability, Mar. 26-30, 2012, Jeju, Korea.

Huawei, Nokia Siemens Networks, Samsung, 3GPP TSG-RAN WG3 Meeting #77 R3-121872, Support of MBMS Service Continuity, Change Request, Aug. 13-17, 2012, Qingdao, China.

"3rd Generation Partnership Project; Technical Specification Group Radio Access Network; NG-RAN; Xn application protocol (XnAP) (Release 16)", 3GPP TS 38.423 V16.1.0 (Mar. 2020), Valbonne, France.

* cited by examiner

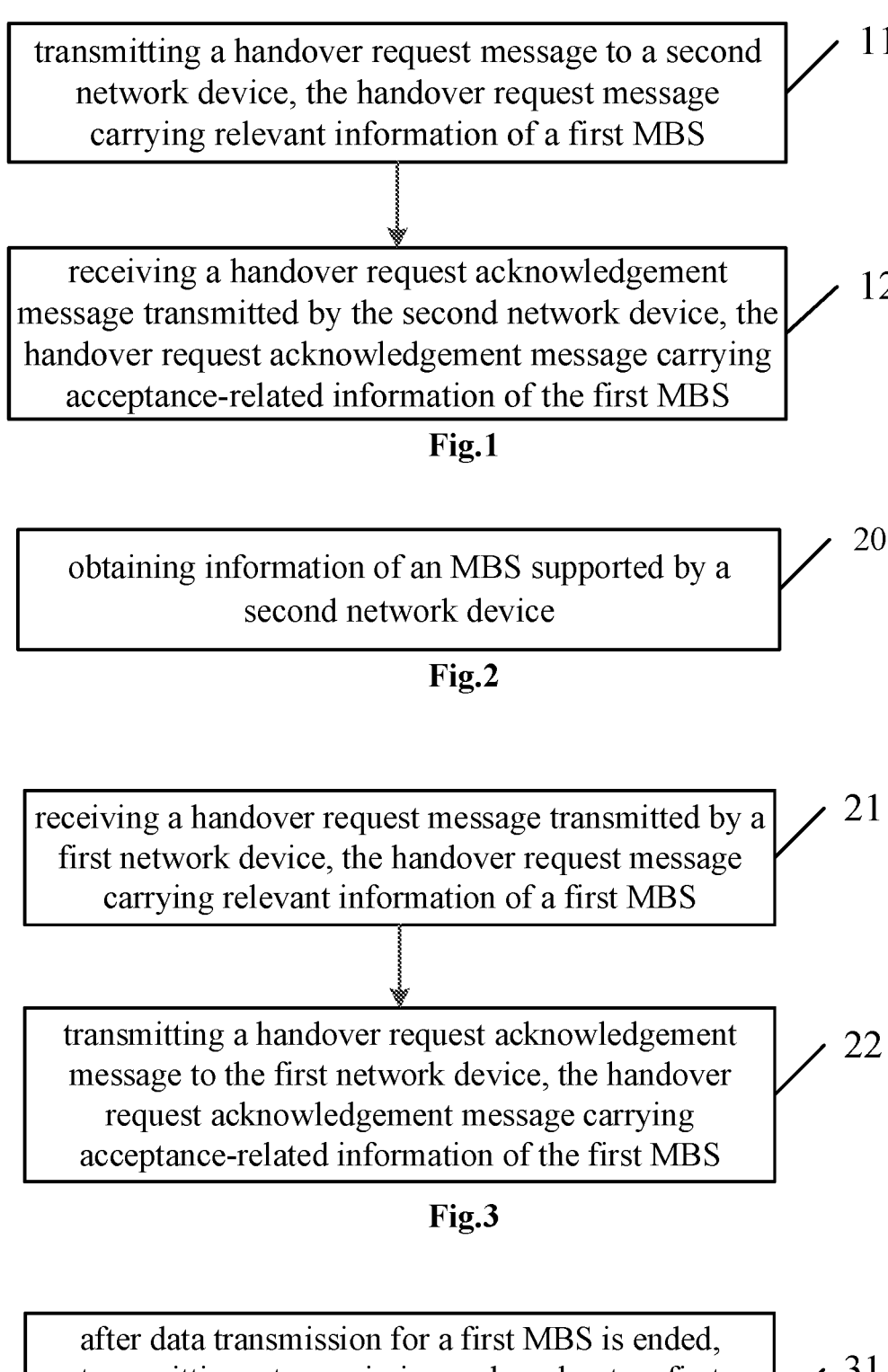

transmitting a handover request message to a second
network device, the handover request message
carrying relevant information of a first MBS
— 11 receiving a handover request acknowledgement
message transmitted by the second network device, the
handover request acknowledgement message carrying
acceptance-related information of the first MBS
— 12

Fig.1 obtaining information of an MBS supported by a
second network device
— 20

Fig.2 receiving a handover request message transmitted by a
first network device, the handover request message
carrying relevant information of a first MBS
— 21 transmitting a handover request acknowledgement
message to the first network device, the handover
request acknowledgement message carrying
acceptance-related information of the first MBS
— 22

Fig.3 after data transmission for a first MBS is ended,
transmitting a transmission end marker to a first
network device, the transmission end marker being
used to indicate that the data transmission for the first
MBS for the first network device has been ended
— 31

Fig.4 terminal | first network device | second network device | core network control panel network element | core network gateway measuring configuration and reporting handover request MBS session request MBS session establishment/ modification request MBS session establishment/ modification reply MBS session request reply MBS session establishment handover request acknowledgement establishing MBS session triggered through handover, not transmitting data handover command 1　2　　　　　　　　N-1　N data transmission for first MBS random access process data forwarding 1　2　N-1　N first indication information first indication information data transmission for first MBS

N+1　N+2 data transmission (data forwarded by the first network device is transmitted at first)

1　2　N-1　N　N+1　N+2 transmission end marker transmission end marker

Fig.5

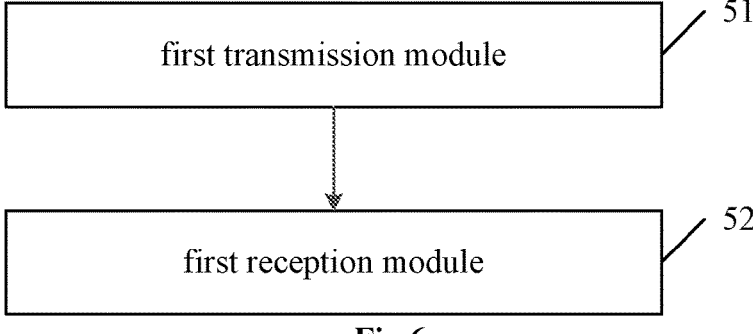

first transmission module　/ 51 first reception module　/ 52

Fig.6

91 third transmission module

100 processor

110 bus interface transceiver

HANDOVER METHOD, PROCESSING METHOD, DEVICES, NETWORK DEVICE AND CORE NETWORK DEVICE

CROSS-REFERENCE TO RELATED APPLICATION

This application is the U.S. national phase of PCT Application No. PCT/CN2021/099320 filed on Jun. 10, 2021, which claims a priority of the Chinese patent application No. 202010523600.1 filed in China on Jun. 10, 2020, which is incorporated herein by reference in its entirety.

TECHNICAL FIELD

The present disclosure relates to the field of wireless communication technology, in particular to a handover method, a processing method, devices, a network device, and a core network device.

BACKGROUND

In order to effectively utilize mobile network resources, a Multimedia Broadcast Multicast Service (MBMS) has been proposed. This service is a technology for transmitting data from one data source to a plurality of target mobile terminals, so as to achieve the resource sharing of networks (including a core network, a transmission network and an access network), thereby to improve utilization of the network resources, especially air-interface resources.

In 4th-Generation (4G) system, the MBMS is mainly applied in such service scenarios as broadcast and television services, and public security, so the service itself is predefined as a multicast service. In order to ensure coverage, the network is divided into a plurality of multicast broadcast regions. The broadcasting is performed in these regions, and a specific position for transmitting the broadcast services and a Temporary Mobile Group Identity (TMGI) is notified to the terminal, so that the terminal obtains, on its own initiative, a responded broadcast content at a corresponding position in accordance with its own subscription condition. To be specific, two transmission modes are supported at an air interface, i.e., Multicast Broadcast Single Frequency Network (MBSFN) and Single Cell Point-To Multipoint (SC-PTM).

As a main principle of MBSFN, a predefined multicast content is transmitted simultaneously on a plurality of base stations within an MBSFN region, and is transmitted on an MBSFN subframe. A condition about the MBSFN subframe is notified to the terminal through a System Information Block (SIB2), and configuration information of the MBSFN region, a Multicast Control Channel (MCCH) configuration and an MBMS notification message is notified to the terminal through an SIB13. The terminal obtains MBMS service information carried on a Multicast Traffic Channel (MTCH) and a specific position for transmitting a Physical Broadcast Channel (PBCH) corresponding to the MTCH by receiving an MBSFN region configuration message carried in the MCCH. Through broadcasting the above information, the terminal receives a content of interest on its own initiative.

As a main principle of SC-PTM, the predefined multicast content is broadcast or multicast in a certain cell, and time-domain configuration information of an SC-MCCH Physical Downlink Control Channel (PDCCH) is broadcast on an SIB20. Through demodulating the SC-MCCH PDCCH, the terminal obtains SC-PTM configuration message carried in the MCCH, the MBMS service information carried on the SC-MTCH, and SC-MTCH PDDCH scheduling information. Through broadcasting the above information, the terminal receives the content of interest on its own initiative.

SUMMARY

An object of the present disclosure is to provide a handover method, a processing method, a handover device, a processing device, a network device, and a core network device, so as to solve the problem in the related art where it is impossible ensure service continuity when the terminal hands over from a cell supporting an Multicast Broadcast Service (MBS) session to a cell supporting or not supporting the MBS session.

In one aspect, the present disclosure provides in some embodiments a handover method performed by a first network device, including: transmitting a handover request message to a second network device, the handover request message carrying relevant information of a first MBS; and receiving a handover request acknowledgement message transmitted by the second network device, the handover request acknowledgement message carrying access control-related information of the first MBS.

In at least one embodiment of the present disclosure, the first MBS includes at least one of an MBS requested by the first network device to be established, an MBS being currently transmitted or joined by a terminal, or an MBS in which the terminal is interested.

In at least one embodiment of the present disclosure, the handover method further includes transmitting a handover command to the terminal, and stopping transmitting data of the first MBS to the terminal, wherein the handover command is used for instructing the terminal to hand over to the second network device.

In at least one embodiment of the present disclosure, the relevant information of the first MBS includes at least one of Quality of Service (QoS) flow information of the first MBS, service identification information of the first MBS, identification information of a first MBS group, session information of the first MBS, a transmission mode adopted by the first network device for the first MBS, or a transmission mode expected or selected by the terminal.

In at least one embodiment of the present disclosure, the access control-related information of the first MBS includes at least one of a QoS flow for an accepted first MBS, session information of the accepted first MBS, a QoS flow for an unaccepted first MBS, session information of the unaccepted first MBS, an established or to-be-established first MBS session, TNL address information for data forwarding, or a transmission mode of the first MBS.

In at least one embodiment of the present disclosure, the transmission mode includes at least one of a unicast transmission mode, a multicast transmission mode, a point-to-point transmission mode, or a point-to-multipoint transmission mode.

In at least one embodiment of the present disclosure, the handover method further includes: receiving data of the first MBS transmitted by a core network device; and receiving an end marker transmitted by the core network device, the end marker being used to indicate that data transmission of the first MBS for the first network device is ended.

In at least one embodiment of the present disclosure, the receiving the end marker transmitted by the core network device includes: receiving a tunnel header of an MBS session transmitted by the core network device, the tunnel header carrying the end marker; and/or receiving a tunnel header of a unicast session transmitted by the core network device, the tunnel header carrying the end marker.

In at least one embodiment of the present disclosure, the tunnel header of the MBS session further carries user identification information.

In at least one embodiment of the present disclosure, the handover method further includes forwarding the data of the first MBS received from the core network device to the second network device in accordance with TNL address information for data forwarding in the handover request acknowledgement message.

In at least one embodiment of the present disclosure, the handover method further includes transmitting the end marker received from the core network device to the second network device.

In another aspect, the present disclosure provides in some embodiments an information interaction method performed by a first network device, including obtaining information of an MBS supported by a second network device. The supported MBS information includes at least one of QoS flow information of an established MBS, information of an established MBS session, a supported transmission mode, identification information of the supported MBS, or whether the MBS being supported or not.

In at least one embodiment of the present disclosure, the information interaction method further includes: determining whether the second network device supports a first MBS; and in the case that the second network device selected by the first network device does not support the first MBS, triggering a core network device to perform a switching process from multicast to unicast. The first MBS includes at least one of an MBS requested by the first network device to be established, an MBS being currently transmitted or joined by a terminal, or an MBS in which the terminal is interested.

In at least one embodiment of the present disclosure, the obtaining the information of the MBS supported by the second network device includes: obtaining the information of the MBS supported by the second network device through interface interaction between the first network device and the second network device; or obtaining the information of the MBS supported by the second network device and forwarded by a third network device; or receiving the information of the MBS supported by the second network device and configured by a network management device; or receiving the information of the MBS supported by the second network device and reported by a terminal, the information of the MBS supported by the second network device and reported by the terminal being determined by the terminal in accordance with MBS control information or system information of the second network device.

In at least one embodiment of the present disclosure, the obtaining the information of the MBS supported by the second network device through interface interaction between the first network device and the second network device comprises: receiving, by the first network device, a message comprising a mapping relationship between the MBS sessions and associated sessions transmitted by the second network device, to infer that the second network device does not support the MBS.

In yet another aspect, the present disclosure provides in some embodiments a handover method performed by a second network device, including: receiving a handover request message transmitted by a first network device, the handover request message carrying relevant information of a first MBS; and transmitting a handover request acknowledgement message to the first network device, information of the first MBS.

In at least one embodiment of the present disclosure, when determining a first MBS session or user plane resource between the second network device and the core network is currently not established by the second network device or does not exist, the handover method further includes triggering a core network device to setup the MBS session between the second network device and the core network device or the user plane resource between the second network device and the core network device for the MBS session.

In at least one embodiment of the present disclosure, the triggering the core network device to setup the MBS session between the second network device and the core network device or the user plane resource from the second network device to the core network device includes: transmitting an MBS session request message or a user plane resource request message between the second network device and the core network device, the MBS session request message or the user plane resource request message carrying at least one of the relevant information of the first MBS, a handover instruction or a transmission network layer address of the second network device; and receiving an MBS session reply message or a user plane resource request reply message transmitted by the core network device.

In at least one embodiment of the present disclosure, the MBS session request reply message or the user plane resource request reply message transmitted by the core network device includes Internet Protocol (IP) multicast address information.

In at least one embodiment of the present disclosure, the triggering the core network device to establish the MBS session between the second network device and the core network device includes: transmitting an MBS session application or indication message, the MBS session application or indication message carrying at least one of the relevant information of the first MBS, a handover instruction or a transmission network layer address of the second network device; receiving an MBS session resource establishment request message transmitted by the core network device; and establishing the first MBS session in accordance with the MBS session resource establishment request message, and then transmitting an MBS session resource establishment reply message to the core network device.

In at least one embodiment of the present disclosure, the first MBS includes at least one of an MBS requested to be established, an MBS being currently transmitted or joined by a terminal, or an MBS in which the terminal is interested.

In at least one embodiment of the present disclosure, the relevant information of the first MBS includes at least one of QoS flow information of the first MBS, service identification information of the first MBS, identification information of a first MBS group, session information of the first MBS, a transmission mode adopted by the first network device for the first MBS, or a transmission mode expected or selected by a terminal.

In at least one embodiment of the present disclosure, the access control-related information of the first MBS includes at least one of a QoS flow for an accepted first MBS, session information of the accepted first MBS, a QoS flow for an unaccepted first MBS, session information of the unaccepted first MBS, an established or to-be-established first MBS session, TNL address information for data forwarding, or a transmission mode of the first MBS.

In at least one embodiment of the present disclosure, the transmission mode includes at least one of a unicast transmission mode, a multicast transmission mode, a point-to-point transmission mode, or a point-to-multipoint transmission mode.

In at least one embodiment of the present disclosure, the handover method further includes receiving data of the first MBS that is received by the first network device from the core network device and forwarded by the first network device.

In at least one embodiment of the present disclosure, the handover method further includes receiving an end marker transmitted by the first network device and received by the first network device from the core network device, and the end marker is used to indicate that data transmission of the first MBS for the first network device is ended.

In at least one embodiment of the present disclosure, the handover method further includes: receiving a random access request transmitted by a terminal, and determining that the terminal has accessed to the second network device; and transmitting first indication information to the core network device, the first indication information being used to indicate that the terminal has accessed to the second network device successfully, or the first indication information is used to request the core network device to transmit data of the first MBS, or the first indication information is used for a path handover request.

In at least one embodiment of the present disclosure, the handover method further includes: transmitting the data of the first MBS forwarded by the first network device to the terminal which has accessed to the second network device successfully; and transmitting the data of the first MBS to the core network device.

In still yet another aspect, the present disclosure provides in some embodiments an MBS processing method performed by a core network device, including, after data transmission for a first MBS is ended, transmitting an end marker to a first network device, the end marker being used to indicate that the data transmission for the first MBS for the first network device has been ended.

In at least one embodiment of the present disclosure, the first MBS includes at least one of an MBS requested by the first network device to be established, an MBS being currently transmitted or joined by a terminal, or an MBS in which the terminal is interested.

In at least one embodiment of the present disclosure, prior to transmitting the end marker to the first network device, the MBS processing method further includes: receiving an MBS session request message or a user plane resource request message between the second network device and the core network device transmitted by a second network device, the MBS session request message or the user plane resource request message carrying at least one of relevant information of the first MBS, a handover instruction or a transmission network layer address of the second network device; establishing a first MBS session resource or a user plane resource between the second network device and the core network device requested by the second network device in accordance with the MBS session request message or the user plane resource request message between the second network device and the core network device; and transmitting an MBS session request reply message or a user plane resource request reply message to the second network device.

In at least one embodiment of the present disclosure, prior to transmitting the end marker to the first network device, the MBS processing method further includes: receiving an MBS application or instruction message transmitted by the second network device, the MBS application or instruction message carrying at least one of relevant information of the first MBS, a handover instruction or a transmission network layer address of the second network device; transmitting an MBS session resource establishment request message to the second network device; and receiving an MBS session resource establishment reply message transmitted by the second network device.

In at least one embodiment of the present disclosure, the relevant information of the first MBS includes at least one of QoS flow information of the first MBS, service identification information of the first MBS, identification information of a first MBS group, session information of the first MBS, a transmission mode adopted by the first network device for the first MBS, or a transmission mode expected or selected by a terminal.

In at least one embodiment of the present disclosure, the MBS processing method further includes: receiving first indication information transmitted by a second network device, the first indication information being used to indicate that a terminal has accessed to the second network device successfully, or the first indication information being used to request the core network device to transmit data of the first MBS, or the first indication information being used for a path handover request; and determining a last data packet to be transmitted to the first network device in accordance with the first indication information, and transmitting an end marker to the first network device.

In still yet another aspect, the present disclosure provides in some embodiments a handover device for a first network device, including: a first transmission module configured to transmit a handover request message to a second network device, the handover request message carrying relevant information of a first MBS; and a first reception module configured to receive a handover request acknowledgement message transmitted by the second network device, the handover request acknowledgement message carrying access control-related information of the first MBS.

In still yet another aspect, the present disclosure provides in some embodiments a network device, which is a first network device including a processor and a transceiver. The transceiver is configured to transmit and receive data under the control of the processor. The processor is configured to: transmit a handover request message to a second network device, the handover request message carrying relevant information of a first MBS; and receive a handover request acknowledgement message transmitted by the second network device, the handover request acknowledgement message carrying access control-related information of the first MBS.

In still yet another aspect, the present disclosure provides in some embodiments an information interaction device for a first network device, including an obtaining module configured to obtain information of an MBS supported by a second network device. The supported MBS information includes at least one of QoS flow information of an established MBS, information of an established MBS session, a supported transmission mode, identification information of the supported MBS, or whether the MBS being supported or not.

In still yet another aspect, the present disclosure provides in some embodiments a network device, which is a first network device including a processor and a transceiver. The transceiver is configured to receive and transmit data under the control of the processor. The processor is configured to obtain information of an MBS supported by a second network device. The supported MBS information includes at least one of QoS flow information of an established MBS, information of an established MBS session, a supported transmission mode, identification information of the supported MBS, or whether the MBS being supported or not.

In still yet another aspect, the present disclosure provides in some embodiments a handover device for a second network device, including: a second reception module configured to receive a handover request message transmitted by a first network device, the handover request message carrying relevant information of a first MBS; and a second transmission module configured to transmit a handover request acknowledgement message to the first network device, the handover request acknowledgement message carrying access control-related information of the first MBS.

In still yet another aspect, the present disclosure provides in some embodiments a network device, which is a second network device including a processor and a transceiver. The transceiver is configured to receive and transmit data under the control of the processor. The processor is configured to: receive a handover request message transmitted by a first network device, the handover request message carrying relevant information of a first MBS; and transmit a handover request acknowledgement message to the first network device, the handover request acknowledgement message carrying access control-related information of the first MBS.

In still yet another aspect, the present disclosure provides in some embodiments an MBS processing device for a core network device, including a third transmission module configured to, after data transmission for a first MBS is ended, transmit an end marker to a first network device, the end marker being used to indicate that the data transmission for the first MBS for the first network device has been ended.

In still yet another aspect, the present disclosure provides in some embodiments a core network device including a processor and a transceiver. The transceiver is configured to receive and transmit data under the control of the processor. The processor is configured to, after data transmission for a first MBS is ended, transmit an end marker to a first network device, and the end marker is used to indicate that the data transmission for the first MBS for the first network device has been ended.

In still yet another aspect, the present disclosure provides in some embodiments a communication device, including a memory, a processor, and a program stored in the memory and configured to be executed by the processor. The processor is configured to execute the program so as to implement the above-mentioned handover method or MBS processing method.

In still yet another aspect, the present disclosure provides in some embodiments a computer-readable storage medium storing therein a computer program. The computer program is executed by a processor so as to implement the above-mentioned handover method or MBS processing method.

The present disclosure at least has the following beneficial effects.

According to the handover method, the processing method, the handover device, the processing device, the network device and the core network device in the embodiments of the present disclosure, through information interaction in a handover process between the first network device and the second network device as well as signaling interaction among the first network device, the second network device and the core network device, it is able to ensure the service continuity when the terminal hands over from a cell supporting the MBS session to a cell supporting or not supporting the MBS session, thereby to improve the user experience with respect to the MBS.

BRIEF DESCRIPTION OF THE DRAWINGS

FIG. 1 is a flow chart of a handover method according to at least one embodiment of the present disclosure;

FIG. 2 is another flow chart of the handover method according to at least one embodiment of the present disclosure;

FIG. 3 is a flow chart of an information interaction method according to at least one embodiment of the present disclosure;

FIG. 4 is a flow chart of an MBS processing method according to at least one embodiment of the present disclosure;

FIG. 5 is a schematic view showing interaction of example 1 according to at least one embodiment of the present disclosure;

FIG. 6 is a schematic view showing a handover device according to at least one embodiment of the present disclosure;

DETAILED DESCRIPTION

Figures 7, 8, 9, 10, 11:
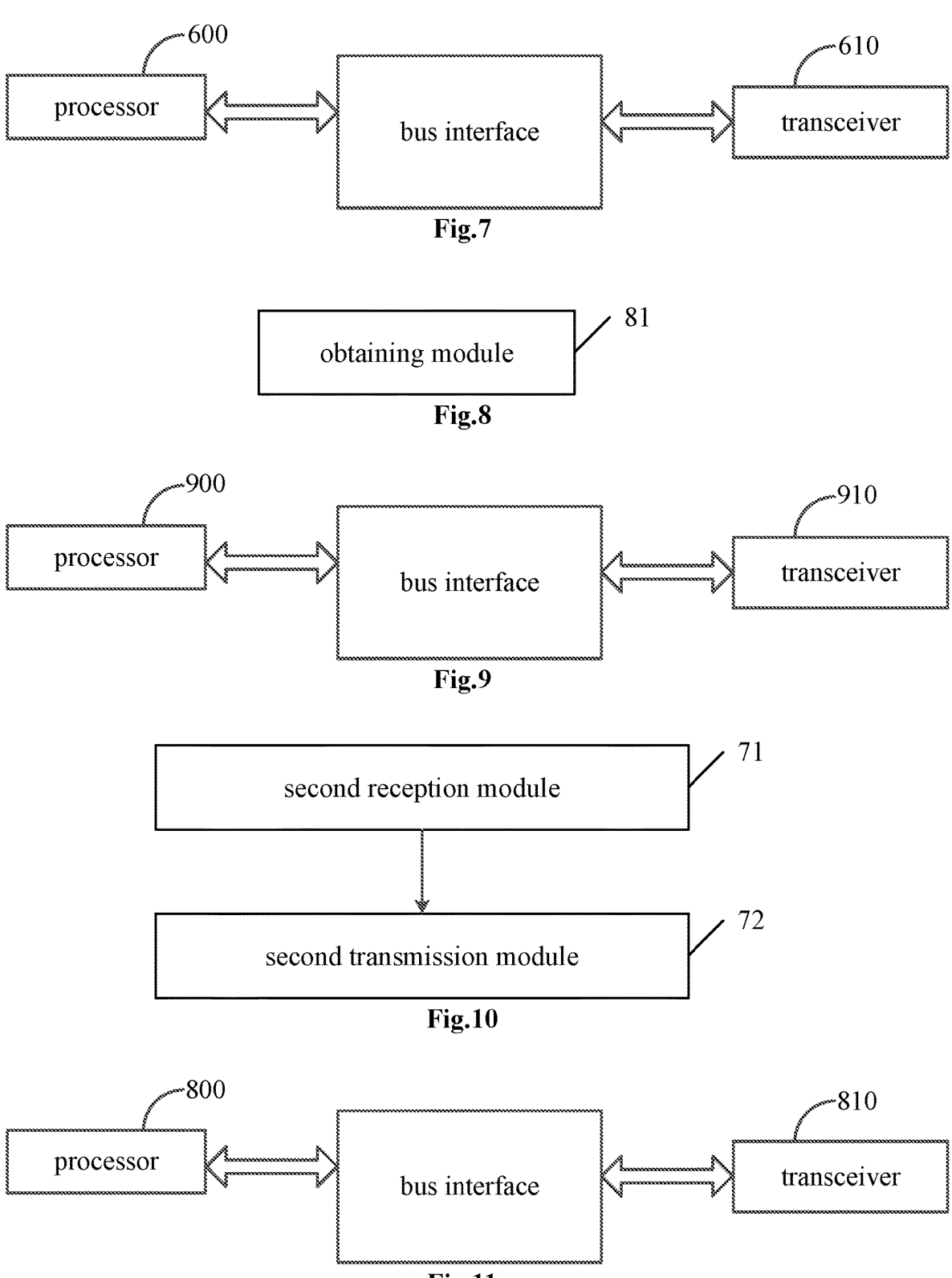
FIG. 7 is a schematic view showing a network device according to at least one embodiment of the present disclosure.
FIG. 8 is a schematic view showing an information interaction device according to at least one embodiment of the present disclosure.
FIG. 9 is another schematic view showing the network device according to at least one embodiment of the present disclosure.
FIG. 10 is another schematic view showing the handover device according to at least one embodiment of the present disclosure.
FIG. 11 is yet another schematic view showing the network device according to at least one embodiment of the present disclosure.

Whether an MBS session is to be established by a network depends on whether an MBS has been subscribed by a user at a base station. Therefore, in actual deployment, there is such a circumstance where an MBS session for a certain service has been established by a neighboring base station or cell but the MBS session for the service has not been established by some other base stations yet, so it may happen that the MBS is not supported when a terminal hands over from one cell to another cell. Even if a target base station supports the current MBS, there is still a problem on how to ensure the service continuity in a handover scenario.

In the related art, the MBS is mainly applied in predefined services and regions such as broadcasting, and there are the following problems.

(1) Multicast broadcast regions are divided in advance, and usually there is a certain binding relationship between the multicast broadcast region and a frequency. For the service continuity in the related art, how to ensure that the terminal selects a cell supporting the MBS as possible is taken into consideration. For example, for a terminal in an idle state, a frequency supporting the MBS is preferentially selected; for a terminal in a connected state, the interest in the MBS is preferentially taken into consideration during the handover of a unicast service, and a cell supporting the MBS is selected as possible.

(2) An known MBS is transmitted on a fixed physical channel for the terminals in the connected state and in the idle state, and a multicast service handover process is not supported.

(3) When the terminal moves to a cell where no MBS session is established and finds that there is no MBS service, an MBS addition/subscription function is triggered, so as to trigger the establishment of the MBS session between the core network and the base station. However, a data flow generated by a service server is continuous, and it takes a certain time period for the establishment of the MBS session. In this time period, it is impossible for the terminal to receive the MBS from a target cell, and it is impossible to ensure the service continuity. At this time, the terminal may lose a part of MBS data, leading to a video lag, even a loss of key security information for Vehicle to Everything (V2X) MBS.

In order to make the objects, the technical solutions and the advantages of the present disclosure more apparent, the present disclosure will be described hereinafter in details in conjunction with the drawings and embodiments.

As shown in FIG. 1, the present disclosure provides in at least one embodiment a handover method performed by a first network device, which includes: Step 11 of transmitting a handover request message to a second network device, the handover request message carrying relevant information of a first MBS; and Step 12 of receiving a handover request acknowledgement message transmitted by the second network device, the handover request acknowledgement message carrying access control-related information of the first MBS.

In the at least one embodiment of the present disclosure, the first network device configures terminal measuring and reporting, determines that a terminal needs to hand over to the second network device in accordance with a measurement report from the terminal, and transmits the handover request message to the selected second network device. The first MBS carried in the handover request message includes at least one of an MBS requested by the first network device to be established, an MBS being currently transmitted or added by the terminal, or an MBS in which the terminal is interested.

In at least one embodiment of the present disclosure, after receiving a handover request acknowledgement message transmitted by the second network device, the handover method further includes transmitting a handover command to the terminal for instructing the terminal to hand over to the second network device, and stopping transmitting data of the first MBS to the terminal.

In at least one embodiment of the present disclosure, the relevant information of the first MBS includes at least one of QoS flow information of the first MBS, service identification information of the first MBS, identification information of a first MBS group (e.g., TMGI or session ID), session information of the first MBS, a transmission mode adopted by the first network device for the first MBS, or a transmission mode expected or selected by the terminal.

In at least one embodiment of the present disclosure, the access control-related information of the first MBS includes at least one of a QoS flow for an accepted first MBS, session information of the accepted first MBS, a QoS flow for an unaccepted first MBS, session information of the unaccepted first MBS, an established or to-be-established first MBS session, TNL address information for data forwarding (e.g., a Transmission Network Layer (TNL) address of the network device), or a transmission mode of the first MBS.

The transmission mode includes at least one of a unicast transmission mode, a multicast transmission mode, a point-to-point transmission mode, or a point-to-multipoint transmission mode.

In addition, in at least one embodiment of the present disclosure, after receiving the handover request acknowledgement message transmitted by the second network device, the handover method further includes: receiving data of the first MBS transmitted by a core network device; and receiving an end marker transmitted by the core network device, the end marker being used to indicate that data transmission of the first MBS for the first network device is ended.

In at least one embodiment of the present disclosure, the receiving the end marker transmitted by the core network device includes: receiving a tunnel header of an MBS session transmitted by the core network device, the tunnel header carrying the end marker; and/or receiving a tunnel header of a unicast session transmitted by the core network device, the tunnel header carrying the end marker.

The tunnel header of the MBS session further carries user identification information, e.g., an Application Protocol ID (AP ID) of the network device and the core network control panel terminal.

In at least one embodiment of the present disclosure, the handover method further includes forwarding the data of the first MBS received from the core network device to the second network device in accordance with TNL address information for data forwarding in the handover request acknowledgement message.

In at least one embodiment of the present disclosure, the handover method further includes transmitting the end marker received from the core network device to the second network device, so that the second network device transmits the data of the first MBS forwarded by the first network device to the terminal, and then transmits the data of the first MBS received from the core network device to the terminal in accordance with a transmission reception identifier after all the data forwarded by the first network device has been transmitted, so as to ensure the data transmission continuity.

In the at least one embodiment of the present disclosure, no matter whether the second network device supports the first MBS, the first network device may perform the multicast service handover through the handover request message and the handover request acknowledgement message.

As a result, in the at least one embodiment of the present disclosure, through the information interaction of a handover process between the first network device and the second network device as well as the forwarding by the first network device the data of the MBS from the core network device, it is able to ensure the service continuity when the terminal hands over from a cell supporting the MBS session to a cell supporting or not supporting the MBS session, thereby to improve the user experience with respect to the MBS.

As shown in FIG. 2, the present disclosure further provides in at least one embodiment a handover method performed by a first network device, which includes Step 20 of obtaining information of an MBS supported by a second network device. The supported MBS information includes at least one of QoS flow information of an established MBS, information of an established MBS session, a supported transmission mode, identification information of the supported MBS, or whether the MBS being supported or not.

In at least one embodiment of the present disclosure, the method further includes: determining whether the second network device supports a first MBS; and in the case that the second network device selected by the first network device does not support the first MBS, triggering a core network device to perform a switching process from multicast to unicast. The first MBS includes at least one of an MBS requested by the first network device to be established, an MBS being currently transmitted or joined by a terminal, or an MBS in which the terminal is interested.

In other words, in the at least one embodiment of the present disclosure, the first network device determines in advance the MBS information supported by the second network device. When the first network device selects a network device (base station or cell) to which the terminal is to hand over in accordance with a measurement report and finds that the selected second network device does not support the first MBS, it triggers a handover process from a multicast service to a unicast service to the core network device. After the handover process has been completed, a unicast handover process is started. The unicast handover process will not be particularly defined herein.

In at least one embodiment of the present disclosure, Step 20 includes: obtaining the information of the MBS supported by the second network device through interface interaction between the first network device and the second network device; or obtaining the information of the MBS supported by the second network device and forwarded by a third network device; or receiving the information of the MBS supported by the second network device and configured by a network management device; or receiving the information of the MBS supported by the second network device and reported by a terminal, the information of the MBS supported by the second network device and reported by the terminal being determined by the terminal in accordance with MBS control information or system information of the second network device.

In at least one embodiment of the present disclosure, the obtaining the information of the MBS supported by the second network device through interface interaction between the first network device and the second network device comprises: receiving, by the first network device, a message comprising a mapping relationship between the MBS sessions and associated sessions transmitted by the second network device, to infer that the second network device does not support the MBS.

As a result, according to the at least one embodiment of the present disclosure, through the information interaction of a handover process between the first network device and each of the second network device and the core network device, it is able for the terminal to hand over to unicast transmission when the terminal hands over from a cell supporting the MBS session to a cell supporting or not supporting the MBS session, thereby to ensure the service continuity and improve the user experience.

As shown in FIG. 3, the present disclosure further provides in at least one embodiment an information interaction method performed by a second network device, which includes: Step 21 of receiving a handover request message transmitted by a first network device, the handover request message carrying relevant information of a first MBS; and Step 22 of transmitting a handover request acknowledgement message to the first network device, the handover request acknowledgement message carrying access control-related information of the first MBS.

In the at least one embodiment of the present disclosure, the first network device configures terminal measuring and reporting, determines that a terminal needs to hand over to the second network device in accordance with a measurement report from the terminal, and transmits the handover request message to the selected second network device. The first MBS carried in the handover request message includes at least one of an MBS requested by the first network device to be established, an MBS being currently transmitted or added by the terminal, or an MBS in which the terminal is interested.

In addition, in at least one embodiment of the present disclosure, when determining that an first MBS session or a user plane resource between the second network device and the core network device is currently established by the second network device or exists, the handover request acknowledgement message is directly transmitted to the first network device.

In at least one embodiment of the present disclosure, when determining that the first MBS session or user plane resource between the second network device and the core network device is currently not established by the second network device or does not exist, the handover method further includes triggering a core network device to setup the MBS session between the second network device and the core network device or the user plane resource between the second network device and the core network device for the MBS session.

In at least one embodiment of the present disclosure, the triggering the core network device to setup the MBS session between the second network device and the core network device or the user plane resource from the second network device to the core network device includes: transmitting an MBS session request message or a user plane resource request message between the second network device and the core network device, the MBS session request message or the user plane resource request message carrying at least one of the relevant information of the first MBS, a handover instruction or a transmission network layer address of the second network device; and receiving an MBS session reply message or a user plane resource request reply message transmitted by the core network device.

In at least one embodiment of the present disclosure, the MBS session request reply message or the user plane resource request reply message between the second network device and the core network device transmitted by the core network device includes IP multicast address information.

In at least one embodiment of the present disclosure, the triggering the core network device to establish the MBS session between the second network device and the core network device includes: transmitting an MBS session application or indication message, the MBS session application or indication message carrying at least one of the relevant information of the first MBS, a handover instruction or a transmission network layer address of the second network device; receiving an MBS session resource establishment request message transmitted by the core network device; and establishing the first MBS session in accordance with the MBS session resource establishment request message, and then transmitting an MBS session resource establishment reply message to the core network device.

The MBS session between the second network device and the core network device includes, but not limited to, at least one of a context of the MBS, a control plane resource, a user plane resource or a user plane tunnel.

In at least one embodiment of the present disclosure, the relevant information of the first MBS includes at least one of QoS flow information of the first MBS, service identification information of the first MBS, identification information of a first MBS group (e.g., TMGI or session ID), session information of the first MBS, a transmission mode adopted by the first network device for the first MBS, or a transmission mode expected or selected by the terminal.

In at least one embodiment of the present disclosure, the access control-related information of the first MBS includes at least one of a QoS flow for an accepted first MBS, session information of the accepted first MBS, a QoS flow for an unaccepted first MBS, session information of the unaccepted first MBS, an established or to-be-established first MBS session, TNL address information for data forwarding, or a transmission mode of the first MBS.

The transmission mode includes at least one of a unicast transmission mode, a multicast transmission mode, a point-to-point transmission mode, or a point-to-multipoint transmission mode.

In at least one embodiment of the present disclosure, the handover method further includes receiving data of the first MBS that is received by the first network device from the core network device and forwarded by the first network device.

In at least one embodiment of the present disclosure, the handover method further includes receiving an end marker transmitted by the first network device and received by the first network device from the core network device, and the end marker is used to indicate that data transmission of the first MBS for the first network device is ended.

In at least one embodiment of the present disclosure, the handover method further includes: receiving a random access request transmitted by a terminal, and determining that the terminal has accessed to the second network device; and transmitting first indication information to the core network device, the first indication information being used to indicate that the terminal has accessed to the second network device successfully, or the first indication information is used to request the core network device to transmit data of the first MBS, or the first indication information is used for a path handover request.

In at least one embodiment of the present disclosure, the handover method further includes: transmitting the data of the first MBS forwarded by the first network device to the terminal which has accessed to the second network device successfully; and transmitting the data of the first MBS to the core network device.

In the at least one embodiment of the present disclosure, the second network device transmits the data of the first MBS forwarded by the first network device to the terminal, and transmit the data of the first MBS from the core network device to the terminal in accordance with a transmission reception identifier after all the data has been forwarded by the first network device, so as to ensure the data transmission continuity.

As a result, according to the at least one embodiment of the present disclosure, through the information interaction of a handover process between the first network device and the second network device as well as the forwarding, by the first network device, the data of the MBS from the core network device, it is able to ensure the service continuity when the terminal hands over from a cell supporting the MBS session to a cell supporting or not supporting the MBS session, thereby to improve the user experience with respect to the MBS.

As shown in FIG. 4, the present disclosure further provides in at least one embodiment an MBS processing method performed by a core network device, which includes Step 31 of, after data transmission for a first MBS is ended, transmitting an end marker to a first network device, the end marker being used to indicate that the data transmission for the first MBS for the first network device has been ended.

In at least one embodiment of the present disclosure, the first MBS includes at least one of an MBS requested by the first network device to be established, an MBS being currently transmitted or joined by a terminal, or an MBS in which the terminal is interested.

In at least one embodiment of the present disclosure, prior to transmitting the end marker to the first network device, the MBS processing method further includes: receiving an MBS session request message or a user plane resource request message between the second network device and the core network device transmitted by a second network device, the MBS session request message or the user plane resource request message carrying at least one of relevant information of the first MBS, a handover instruction or a transmission network layer address of the second network device; establishing a first MBS session resource or a user plane resource between the second network device and the core network device requested by the second network device in accordance with the MBS session request message or the user plane resource request message between the second network device and the core network device; and transmitting an MBS session request reply message or a user plane resource request reply message to the second network device.

In another possible embodiment of the present disclosure, prior to transmitting the end marker to the first network device, the MBS processing method further includes: receiving an MBS application or instruction message transmitted by the second network device, the MBS application or instruction message carrying at least one of relevant information of the first MBS, a handover instruction or a transmission network layer address of the second network device; transmitting an MBS session resource establishment request message to the second network device; and receiving an MBS session resource establishment reply message transmitted by the second network device.

In addition, in at least one embodiment of the present disclosure, the relevant information of the first MBS includes at least one of QoS flow information of the first MBS, service identification information of the first MBS, identification information of a first MBS group (e.g., TMGI or session ID), session information of the first MBS, a transmission mode adopted by the first network device for the first MBS, or a transmission mode expected or selected by the terminal.

In at least one embodiment of the present disclosure, the MBS processing method further includes: receiving first indication information transmitted by a second network device, the first indication information being used to indicate that a terminal has accessed to the second network device successfully, or the first indication information being used to request the core network device to transmit data of the first MBS, or the first indication information being used for a path handover request; and determining a last data packet to be transmitted to the first network device in accordance with the first indication information, and transmitting an end marker to the first network device.

After the terminal accesses to the second network device through a random access process, the second network device transmits the first indication information to the core network device, so as to notify the core network device that the terminal has accessed to the second network device successfully or request the core network device to transmit the data of the first MBS or a path handover request. The core network device transmits the end marker to the first network device in accordance with the first indication information, and transmits the data about the first MBMS to the second network device.

According to the at least one embodiment of the present disclosure, through information interaction in a handover process between the first network device and the second network device as well as signaling interaction among the first network device, the second network device and the core network device, it is able to ensure the service continuity when the terminal hands over from a cell supporting the MBS session to a cell supporting or not supporting the MBS session, thereby to improve the user experience with respect to the MBS.

In order to describe the handover method and the MBS processing method in a clearer manner, the following description will be given in conjunction with FIG. 5.

In a first example, the second network device triggers the establishment of a multicast session and the forwarding of multicast data, as shown in FIG. 5.

Step 0: the first network device configures terminal measuring and reporting.

Step 1: the first network device determines that a handover process is to be performed by the terminal in accordance with a measurement report, and transmits a handover request to the second network device. The handover request carries at least one of (the relevant information of the MBS which is currently performed or in which the terminal is interested, i.e., the relevant information of the first MBS): QoS flow information, service identifier information (e.g., TMGI or session ID), identification information of an MBS group, or a multicast session ID.

Step 2: when the second network device finds that a first MBS session currently fails to be established, the second network device transmits an MBS session request to a core network control network element, and when the first MBS session has currently been established, the second network device proceeds to Step 5. The MBS session request carries at least one of QoS flow information (MBS), service identifier information (e.g., TMGI or a session ID), identification information of an MBS group, a handover instruction, a handover cause, or a TNL address of the second network device.

Step 3: the core network control network element exchanges MBS session establishment or modification information with a gateway. When the MBS session exists, the core network control network element transmits new network device reception address and Tunnel Endpoint Identifier (TEID) information to the gateway through the modification message. When the MBS session does not exist, the core network control element establishes the session through the session establishment message, and transmits a base station reception address and the TEID information.

Step 4: the core network control network element transmits a session request reply to the second network device. At this time, the session between the second network device and the core network control network element has already been established, but the core network element does not transmit the MBS data to the second network device immediately. Instead, the core network control network element still continues to transmit the MBS data to a source base station.

Step 5: when a user is to be accepted, the second network device transmits the handover request acknowledgement message to the source base station in accordance with an establishment condition of the MBS session. The handover request acknowledgement message includes whether to establish the MBS session and a data forwarding address. When the MBS session is not supported for the terminal, the second network device transmits a handover request rejection message indicating a rejection cause, e.g., that the MBS is not supported.

Step 6: the first network device transmits the handover command to the terminal, and stops transmitting the data to the terminal.

Step 7: the terminal initiates a random access process to the second network device. After the random access has been performed successful, the second network device transmits the first indication information to the core network control network element, and the core network control network element transmits the first indication information to a core network gateway.

Step 8: at this time, the core network gateway starts to transmit the MBS data to the second network device, and transmits the end marker for the data carried in a last data packet to the first network device. The end marker is for each terminal, and a user identifier, e.g., an AP ID of the base station and the core network control panel terminal, may be transmitted together with the last data packet.

Step 9: the first network device forwards the data of the first MBS received from the core network gateway to the second network device.

Step 9 may be performed after Step 6, and the received end marker of the data may be transmitted to the second network device.

Step 10: the second network device firstly transmits the MBS data forwarded by the first network device, and then transmit a new MBS data packet received from the core network gateway in accordance with the end marker after all the forwarded data packets have been transmitted, so as to ensure the data transmission continuity.

As shown in FIG. 6, the present disclosure further provides in at least one embodiment a handover device for a first network device, which includes: a first transmission module 51 configured to transmit a handover request message to a second network device, the handover request message carrying relevant information of a first MBS; and a first reception module 52 configured to receive a handover request acknowledgement message transmitted by the second network device, the handover request acknowledgement message carrying access control-related information of the first MBS.

In at least one embodiment of the present disclosure, the first MBS includes at least one of an MBS requested by the first network device to be established, an MBS being currently transmitted or joined by a terminal, or an MBS in which the terminal is interested.

In at least one embodiment of the present disclosure, the handover device further includes a fourth transmission module configured to transmit a handover command to the terminal, and stopping transmitting data of the first MBS to the terminal, wherein the handover command is used for indicating the terminal to hand over to the second network device.

In at least one embodiment of the present disclosure, the relevant information of the first MBS includes at least one of QoS flow information of the first MBS, service identification information of the first MBS, identification information of a first MBS group, session information of the first MBS, a transmission mode adopted by the first network device for the first MBS, or a transmission mode expected or selected by the terminal.

In at least one embodiment of the present disclosure, the access control-related information of the first MBS includes at least one of a QoS flow for an accepted first MBS, session information of the accepted first MBS, a QoS flow for an unaccepted first MBS, session information of the unaccepted first MBS, an established or to-be-established first MBS session, TNL address information for data forwarding, or a transmission mode of the first MBS.

In at least one embodiment of the present disclosure, the transmission mode includes at least one of a unicast transmission mode, a multicast transmission mode, a point-to-point transmission mode, or a point-to-multipoint transmission mode.

In at least one embodiment of the present disclosure, the handover device further includes: a third reception module configured to receive data of the first MBS transmitted by a core network device; and a fourth reception module configured to receive an end marker transmitted by the core network device, the end marker being used to indicate that data transmission of the first MBS for the first network device is ended.

In at least one embodiment of the present disclosure, the fourth reception module includes a reception sub-module configured to: receive a tunnel header of an MBS session transmitted by the core network device, the tunnel header carrying the end marker; and/or receiving a tunnel header of a unicast session transmitted by the core network device, the tunnel header carrying the end marker.

In at least one embodiment of the present disclosure, the tunnel header of the MBS session further carries user identification information.

In at least one embodiment of the present disclosure, the handover device further includes a fifth transmission module configured to forward the data of the first MBS received from the core network device to the second network device in accordance with TNL address information for data forwarding in the handover request acknowledgement message.

In at least one embodiment of the present disclosure, the handover device further includes a sixth transmission module configured to transmit the end marker received from the core network device to the second network device.

According to the at least one embodiment of the present disclosure, through the information interaction of a handover process between the first network device and the second network device as well as the forwarding, by the first network device, the data of the MBS from the core network device, it is able to ensure the service continuity when the terminal hands over from a cell supporting the MBS session to a cell supporting or not supporting the MBS session, thereby to improve the user experience with respect to the MBS.

It should be appreciated that, the handover device in the at least one embodiment of the present disclosure is used to implement the above-mentioned handover method, and the implementation of the handover device may refer to that of the handover method with a same or similar beneficial effect.

As shown in FIG. 7, the present disclosure further provides in at least one embodiment a network device, which is a first network device including a processor 600 and a transceiver 610. The transceiver 610 is configured to receive and transmit data under the control of the processor 600. The processor 600 is configured to: transmit a handover request message to a second network device, the handover request message carrying relevant information of a first MBS; and receive a handover request acknowledgement message transmitted by the second network device, the handover request acknowledgement message carrying access control-related information of the first MBS.

In at least one embodiment of the present disclosure, the first MBS includes at least one of an MBS requested by the first network device to be established, an MBS being currently transmitted or joined by a terminal, or an MBS in which the terminal is interested.

In at least one embodiment of the present disclosure, the processor is further configured to transmit a handover command to the terminal for indicating the terminal to hand over to the second network device, and stop transmitting data of the first MBS to the terminal.

In at least one embodiment of the present disclosure, the relevant information of the first MBS includes at least one of QoS flow information of the first MBS, service identification information of the first MBS, identification information of a first MBS group, session information of the first MBS, a transmission mode adopted by the first network device for the first MBS, or a transmission mode expected or selected by the terminal.

In at least one embodiment of the present disclosure, the access control-related information of the first MBS includes at least one of a QoS flow for an accepted first MBS, session information of the accepted first MBS, a QoS flow for an unaccepted first MBS, session information of the unaccepted first MBS, an established or to-be-established first MBS session, TNL address information for data forwarding, or a transmission mode of the first MBS.

In at least one embodiment of the present disclosure, the transmission mode includes at least one of a unicast transmission mode, a multicast transmission mode, a point-to-point transmission mode, or a point-to-multipoint transmission mode.

In at least one embodiment of the present disclosure, the processor is further configured to: receive data of the first MBS transmitted by a core network device; and receive an end marker transmitted by the core network device, the end marker being used to indicate that data transmission of the first MBS for the first network device is ended.

In at least one embodiment of the present disclosure, the processor is further configured to: receive a tunnel header of an MBS session transmitted by the core network device, the tunnel header carrying the end marker; and/or receive a tunnel header of a unicast session transmitted by the core network device, the tunnel header carrying the end marker.

In at least one embodiment of the present disclosure, the tunnel header of the MBS session further carries user identification information.

In at least one embodiment of the present disclosure, the processor is further configured to forward the data of the first MBS received from the core network device to the second network device in accordance with TNL address information for data forwarding in the handover request acknowledgement message.

In at least one embodiment of the present disclosure, the processor is further configured to transmit the end marker received from the core network device to the second network device.

According to the at least one embodiment of the present disclosure, through the information interaction of a handover process between the first network device and the second network device as well as the forwarding, by the first network device, the data of the MBS from the core network device, it is able to ensure the service continuity when the terminal hands over from a cell supporting the MBS session to a cell supporting or not supporting the MBS session, thereby to improve the user experience with respect to the MBS.

It should be appreciated that, the first network device in the at least one embodiment of the present disclosure is used to implement the above-mentioned handover method, and the implementation of the first network device may refer to that of the handover method with a same or similar beneficial effect.

As shown in FIG. 8, the present disclosure further provides in at least one embodiment an information interaction device for a first network device, which includes an obtaining module 81 configured to obtain information of an MBS supported by a second network device. The supported MBS information includes at least one of QoS flow information of an established MBS, information of an established MBS session, a supported transmission mode, identification information of the supported MBS, or whether the MBS being supported or not.

In at least one embodiment of the present disclosure, the information interaction device further includes: a determination module configured to determine whether the second network device supports a first MBS; and a processing module configured to, in the case that the second network device selected by the first network device does not support the first MBS, trigger a core network device to perform a switching process from multicast to unicast. The first MBS includes at least one of an MBS requested by the first network device to be established, an MBS being currently transmitted or joined by a terminal, or an MBS in which the terminal is interested.

In at least one embodiment of the present disclosure, the obtaining module includes an obtaining sub-module configured to: obtain the MBS supported by the second network device through interface interaction between the first network device and the second network device; or obtain the information of the MBS supported by the second network device and forwarded by a third network device; or receive the information of the MBS supported by the second network device and configured by a network management device; or receive the information of the MBS supported by the second network device and reported by a terminal, the information of the MBS supported by the second network device and reported by the terminal being determined by the terminal in accordance with MBS control information or system information of the second network device.

In at least one embodiment of the present disclosure, the obtaining the information of the MBS supported by the second network device through interface interaction between the first network device and the second network device comprises: receiving, by the first network device, a message comprising a mapping relationship between the MBS sessions and associated sessions transmitted by the second network device, to infer that the second network device does not support the MBS.

As a result, according to the at least one embodiment of the present disclosure, through the information interaction of a handover process between the first network device and each of the second network device and the core network device, it is able for the terminal to hand over to unicast transmission when the terminal hands over from a cell supporting the MBS session to a cell supporting or not supporting the MBS session, thereby to ensure the service continuity and improve the user experience.

It should be appreciated that, the information interaction device in the at least one embodiment of the present disclosure is used to implement the above-mentioned information interaction method, and the implementation of the information interaction device may refer to that of the information interaction method with a same or similar beneficial effect.

As shown in FIG. 9, the present disclosure further provides in at least one embodiment a network device which is a first network device including a processor 900 and a transceiver 910. The transceiver 910 is configured to receive and transmit data under the control of the processor 900. The processor 900 is configured to obtain information of an MBS supported by a second network device. The supported MBS information includes at least one of QoS flow information of an established MBS, information of an established MBS session, a supported transmission mode, identification information of the supported MBS, or whether the MBS being supported or not.

In at least one embodiment of the present disclosure, the processor is further configured to: determine whether the second network device supports a first MBS; and in the case that the second network device selected by the first network device does not support the first MBS, trigger a core network device to perform a switching process from multicast to unicast. The first MBS includes at least one of an MBS requested by the first network device to be established, an MBS being currently transmitted or joined by a terminal, or an MBS in which the terminal is interested.

In at least one embodiment of the present disclosure, the processor is further configured to: obtain the MBS supported by the second network device through interface interaction between the first network device and the second network device; or obtain the information of the MBS supported by the second network device and forwarded by a third network device; or receive the information of the MBS supported by the second network device and configured by a network management device; or receive the information of the MBS supported by the second network device and reported by a terminal, the information of the MBS supported by the second network device and reported by the terminal being determined by the terminal in accordance with MBS control information or system information of the second network device.

In at least one embodiment of the present disclosure, the obtaining the information of the MBS supported by the second network device through interface interaction between the first network device and the second network device comprises: receiving, by the first network device, a message comprising a mapping relationship between the MBS sessions and associated sessions transmitted by the second network device, to infer that the second network device does not support the MBS.

As a result, according to the at least one embodiment of the present disclosure, through the information interaction of a handover process between the first network device and each of the second network device and the core network device, it is able for the terminal to hand over to unicast transmission when the terminal hands over from a cell supporting the MBS session to a cell supporting or not supporting the MBS session, thereby to ensure the service continuity and improve the user experience.

It should be appreciated that, the first network device in the at least one embodiment of the present disclosure is used to implement the above-mentioned information interaction method, and the implementation of the first network device may refer to that of the information interaction method with a same or similar beneficial effect.

As shown in FIG. 10, the present disclosure further provides in at least one embodiment a handover device for a second network device, which includes: a second reception module 71 configured to receive a handover request message transmitted by a first network device, the handover request message carrying relevant information of a first MBS; and a second transmission module 72 configured to transmit a handover request acknowledgement message to the first network device, information of the first MBS.

In at least one embodiment of the present disclosure, when determining a first MBS session or user plane resource between the second network device and the core network is currently not established by the second network device or does not exist, the handover device further includes a triggering module configured to trigger a core network device to setup the MBS session between the second network device and the core network device or the user plane resource between the second network device and the core network device for the MBS session.

In at least one embodiment of the present disclosure, the triggering module includes: a first sub-module configured to transmit an MBS session request message or a user plane resource request message, the MBS session request message or the user plane resource request message carrying at least one of the relevant information of the first MBS, a handover instruction or a transmission network layer address of the second network device; and a second sub-module configured to receive an MBS session reply message or a user plane resource request reply message between the second network device and the core network device transmitted by the core network device.

In at least one embodiment of the present disclosure, the triggering module includes: a third sub-module configured to transmit an MBS session application or indication message, the MBS session application or indication message carrying at least one of the relevant information of the first MBS, a handover instruction or a transmission network layer address of the second network device; a fourth sub-module configured to receive an MBS session resource establishment request message transmitted by the core network device; and a fifth sub-module configured to transmit an MBS session resource establishment reply message to the core network device.

In at least one embodiment of the present disclosure, the first MBS includes at least one of an MBS requested to be established, an MBS being currently transmitted or joined by a terminal, or an MBS in which the terminal is interested.

In at least one embodiment of the present disclosure, the relevant information of the first MBS includes at least one of QoS flow information of the first MBS, service identification information of the first MBS, identification information of a first MBS group, session information of the first MBS, a transmission mode adopted by the first network device for the first MBS, or a transmission mode expected or selected by a terminal.

In at least one embodiment of the present disclosure, the access control-related information of the first MBS includes at least one of a QoS flow for an accepted first MBS, session information of the accepted first MBS, a QoS flow for an unaccepted first MBS, session information of the unaccepted first MBS, an established or to-be-established first MBS session, TNL address information for data forwarding, or a transmission mode of the first MBS.

In at least one embodiment of the present disclosure, the transmission mode includes at least one of a unicast transmission mode, a multicast transmission mode, a point-to-point transmission mode, or a point-to-multipoint transmission mode.

In at least one embodiment of the present disclosure, the handover device further includes a seventh reception module configured to receive data of the first MBS transmitted by the core network device and forwarded by the first network device.

In at least one embodiment of the present disclosure, the handover device further includes an eighth reception module configured to receive an end marker transmitted by the core network device and forwarded by the first network device, and the end marker is used to indicate that data transmission of the first MBS for the first network device is ended.

In at least one embodiment of the present disclosure, the handover device further includes: a first access module configured to receive a random access request transmitted by a terminal, and determine that the terminal has accessed to the second network device; and an eighth transmission module configured to transmit first indication information to the core network device, the first indication information being used to indicate that the terminal has accessed to the second network device successfully, or the first indication information is used to request the core network device to transmit data of the first MBS, or the first indication information is used for a path handover request.

In at least one embodiment of the present disclosure, the handover device further includes: a ninth transmission module configured to transmit the data of the first MBS forwarded by the first network device to the terminal which has accessed to the second network device successfully; and a tenth transmission module configured to transmit the data of the first MBS to the core network device.

According to the at least one embodiment of the present disclosure, through the information interaction of a handover process between the first network device and the second network device as well as the forwarding, by the first network device, the data of the MBS from the core network device, it is able to ensure the service continuity when the terminal hands over from a cell supporting the MBS session to a cell supporting or not supporting the MBS session, thereby to improve the user experience with respect to the MBS.

It should be appreciated that, the handover device in the at least one embodiment of the present disclosure is used to implement the above-mentioned handover method, and the implementation of the handover device may refer to that of the handover method with a same or similar beneficial effect.

As shown in FIG. 11, the present disclosure further provides in at least one embodiment a network device, which is a second network device including a processor 800 and a transceiver 810. The transceiver 810 is configured to receive and transmit data under the control of the processor 800. The processor 800 is configured to: receive a handover request message transmitted by a first network device, the handover request message carrying relevant information of a first MBS; and transmit a handover request acknowledgement message to the first network device, the handover request acknowledgement message carrying access control-related information of the first MBS.

In at least one embodiment of the present disclosure, when determining a first MBS session or user plane resource between the second network device and the core network is currently not established by the second network device or does not exist, the processor is further configured to trigger a core network device to setup the MBS session between the second network device and the core network device or the user plane resource between the second network device and the core network device for the MBS session.

In at least one embodiment of the present disclosure, the processor is further configured to: transmit an MBS session request message or a user plane resource request message, the MBS session request message or the user plane resource request message carrying at least one of the relevant information of the first MBS, a handover instruction or a transmission network layer address of the second network device; and receive an MBS session reply message or a user plane resource request reply message between the second network device and the core network device transmitted by the core network device.

In at least one embodiment of the present disclosure, the processor is further configured to: transmit an MBS session application or indication message, the MBS session application or indication message carrying at least one of the relevant information of the first MBS, a handover instruction or a transmission network layer address of the second network device; receive an MBS session resource establishment request message transmitted by the core network device; and transmit an MBS session resource establishment reply message to the core network device.

In at least one embodiment of the present disclosure, the first MBS includes at least one of an MBS requested to be established, an MBS being currently transmitted or joined by a terminal, or an MBS in which the terminal is interested.

In at least one embodiment of the present disclosure, the relevant information of the first MBS includes at least one of QoS flow information of the first MBS, service identification information of the first MBS, identification information of a first MBS group, session information of the first MBS, a transmission mode adopted by the first network device for the first MBS, or a transmission mode expected or selected by a terminal.

In at least one embodiment of the present disclosure, the access control-related information of the first MBS includes at least one of a QoS flow for an accepted first MBS, session information of the accepted first MBS, a QoS flow for an unaccepted first MBS, session information of the unaccepted first MBS, an established or to-be-established first MBS session, TNL address information for data forwarding, or a transmission mode of the first MBS.

In at least one embodiment of the present disclosure, the transmission mode includes at least one of a unicast transmission mode, a multicast transmission mode, a point-to-point transmission mode, or a point-to-multipoint transmission mode.

In at least one embodiment of the present disclosure, the processor is further configured to receive data of the first MBS transmitted by the core network device and forwarded by the first network device.

In at least one embodiment of the present disclosure, the processor is further configured to receive an end marker transmitted by the core network device and forwarded by the first network device, and the end marker is used to indicate that data transmission of the first MBS for the first network device is ended.

In at least one embodiment of the present disclosure, the processor is further configured to: receive a random access request transmitted by a terminal, and determining that the terminal has accessed to the second network device; and transmit first indication information to the core network device, the first indication information being used to indicate that the terminal has accessed to the second network device successfully, or the first indication information is used to request the core network device to transmit data of the first MBS, or the first indication information is used for a path handover request.

In at least one embodiment of the present disclosure, the processor is further configured to: transmit the data of the first MBS forwarded by the first network device to the terminal which has accessed to the second network device successfully; and transmit the data of the first MBS to the core network device.

According to the at least one embodiment of the present disclosure, through the information interaction of a handover process between the first network device and the second network device as well as the forwarding, by the first network device, the data of the MBS from the core network device, it is able to ensure the service continuity when the terminal hands over from a cell supporting the MBS session to a cell supporting or not supporting the MBS session, thereby to improve the user experience with respect to the MBS.

It should be appreciated that, the second network device in the at least one embodiment of the present disclosure is used to implement the above-mentioned handover method, and the implementation of the second network device may refer to that of the handover method with a same or similar beneficial effect.

Figure 12:
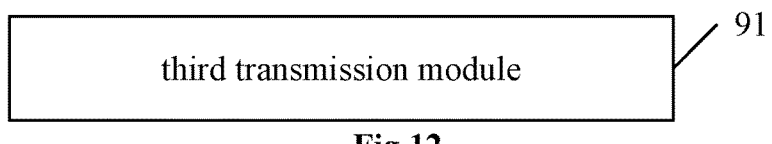
FIG. 12 is a schematic view showing an MBS processing device according to at least one embodiment of the present disclosure.

As shown in FIG. 12, the present disclosure further provides in at least one embodiment an MBS processing device for a core network device, which includes a third transmission module 91 configured to, after data transmission for a first MBS is ended, transmit an end marker to a first network device, the end marker being used to indicate that the data transmission for the first MBS for the first network device has been ended.

In at least one embodiment of the present disclosure, the first MBS includes at least one of an MBS requested by the first network device to be established, an MBS being currently transmitted or joined by a terminal, or an MBS in which the terminal is interested.

In at least one embodiment of the present disclosure, MBS processing device further includes: a ninth reception module configured to receive an MBS session request message or a user plane resource request message between the second network device and the core network device transmitted by a second network device, the MBS session request message or the user plane resource request message carrying at least one of relevant information of the first MBS, a handover instruction or a transmission network layer address of the second network device; a first establishment module configured to establish a first MBS session resource or a user plane resource between the second network device and the core network device requested by the second network device in accordance with the MBS session request message or the user plane resource request message between the second network device and the core network device; and a first reply module configured to transmit an MBS session request reply message or a user plane resource request reply message between the second network device and the core network device to the second network device.

In at least one embodiment of the present disclosure, the MBS processing device further includes: a tenth reception module configured to receive an MBS application or instruction message transmitted by the second network device, the MBS application or instruction message carrying at least one of relevant information of the first MBS, a handover instruction or a transmission network layer address of the second network device; an eleventh transmission module configured to transmit an MBS session resource establishment request message to the second network device; and an eleventh reception module configured to receive an MBS session resource establishment reply message transmitted by the second network device.

In at least one embodiment of the present disclosure, the relevant information of the first MBS includes at least one of QoS flow information of the first MBS, service identification information of the first MBS, identification information of a first MBS group, session information of the first MBS, a transmission mode adopted by the first network device for the first MBS, or a transmission mode expected or selected by a terminal.

In at least one embodiment of the present disclosure, the MBS processing device further includes: a twelfth reception module configured to receive first indication information transmitted by a second network device, the first indication information being used to indicate that a terminal has accessed to the second network device successfully, or the first indication information being used to request the core network device to transmit data of the first MBS, or the first indication information being used for a path handover request; and a twelfth transmission module configured to determine a last data packet to be transmitted to the first network device in accordance with the first indication information, and transmit an end marker to the first network device.

According to the at least one embodiment of the present disclosure, through information interaction in a handover process between the first network device and the second network device as well as signaling interaction among the first network device, the second network device and the core network device, it is able to ensure the service continuity when the terminal hands over from a cell supporting the MBS session to a cell supporting or not supporting the MBS session, thereby to improve the user experience with respect to the MBS.

It should be appreciated that, the MBS processing device in the at least one embodiment of the present disclosure is used to implement the above-mentioned MBS processing method, and the implementation of the MBS processing device may refer to that of the MBS processing method with a same or similar beneficial effect.

Figure 13:
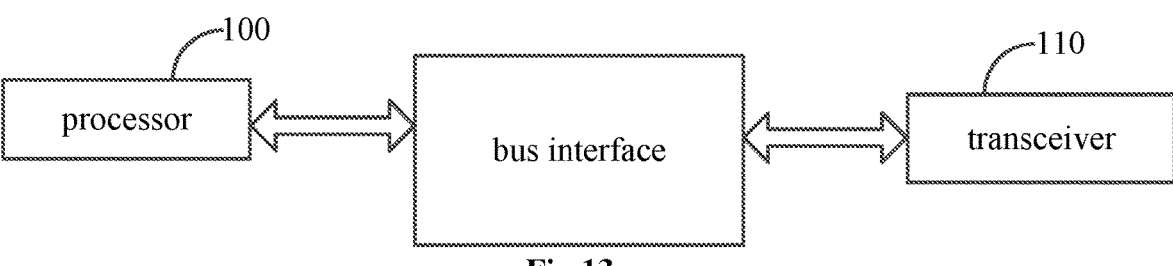
FIG. 13 is a schematic view showing a core network device according to at least one embodiment of the present disclosure.

As shown in FIG. 13, the present disclosure further provides in at least one embodiment a core network device which includes processor 100 and a transceiver 110. The transceiver 110 is configured to receive and transmit data under the control of the processor 100. The processor 100 is configured to, after data transmission for a first MBS is ended, transmit an end marker to a first network device, the end marker being used to indicate that the data transmission for the first MBS for the first network device has been ended.

In at least one embodiment of the present disclosure, the first MBS includes at least one of an MBS requested by the first network device to be established, an MBS being currently transmitted or joined by a terminal, or an MBS in which the terminal is interested.

In at least one embodiment of the present disclosure, the processor is further configured to: receive an MBS session request message or a user plane resource request message between the second network device and the core network device transmitted by a second network device, the MBS session request message or the user plane resource request message carrying at least one of relevant information of the first MBS, a handover instruction or a transmission network layer address of the second network device; establish a first MBS session resource or a user plane resource between the second network device and the core network device requested by the second network device in accordance with the MBS session request message or the user plane resource request message between the second network device and the core network device; and transmit an MBS session request reply message or a user plane resource request reply message between the second network device and the core network device to the second network device.

In at least one embodiment of the present disclosure, the processor is further configured to: receive an MBS application or instruction message transmitted by the second network device, the MBS application or instruction message carrying at least one of relevant information of the first MBS, a handover instruction or a transmission network layer address of the second network device; transmit an MBS session resource establishment request message to the second network device; and receive an MBS session resource establishment reply message transmitted by the second network device.

In at least one embodiment of the present disclosure, the relevant information of the first MBS includes at least one of QoS flow information of the first MBS, service identification information of the first MBS, identification information of a first MBS group, session information of the first MBS, a transmission mode adopted by the first network device for the first MBS, or a transmission mode expected or selected by a terminal.

In at least one embodiment of the present disclosure, the processor is further configured to: receive first indication information transmitted by a second network device, the first indication information being used to indicate that a terminal has accessed to the second network device successfully, or the first indication information being used to request the core network device to transmit data of the first MBS, or the first indication information being used for a path handover request; and determine a last data packet to be transmitted to the first network device in accordance with the first indication information, and transmit an end marker to the first network device.

According to the at least one embodiment of the present disclosure, through information interaction in a handover process between the first network device and the second network device as well as signaling interaction among the first network device, the second network device and the core network device, it is able to ensure the service continuity when the terminal hands over from a cell supporting the MBS session to a cell supporting or not supporting the MBS session, thereby to improve the user experience with respect to the MBS.

It should be appreciated that, the core network device in the at least one embodiment of the present disclosure is used to implement the above-mentioned MBS processing method, and the implementation of the core network device may refer to that of the MBS processing method with a same or similar beneficial effect.

The present disclosure further provides in at least one embodiment a communication device, which includes a memory, a processor, and a computer program stored in the memory and configured to be executed by the processor. The processor is configured to execute the program so as to implement the above-mentioned handover method or the above-mentioned MBS processing method with a same technical effect, which will not be repeatedly defined herein.

The present disclosure further provides in at least one embodiment a computer-readable storage medium storing therein a computer program. The computer program is executed by a processor so as to implement the above-mentioned handover method or the above-mentioned MBS processing method with a same technical effect, which will not be repeatedly defined herein. The computer-readable storage medium may be a volatile or nonvolatile storage medium, e.g., Read Only Memory (ROM), Random Access Memory (RAM), magnetic disc or optical disc.

It should be appreciated that, the present disclosure may be provided as a method, a system or a computer program product, so the present disclosure may be in the form of full hardware embodiments, full software embodiments, or combinations thereof. In addition, the present disclosure may be in the form of a computer program product implemented on one or more computer-readable storage mediums (including but not limited to disk memory, and optical memory) including computer-readable program codes.

The present disclosure has been described with reference to the flow charts and/or block diagrams of the method, device (system) and computer program product according to the at least one embodiment of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicated computer, an embedded processor or any other programmable data processing devices to create a machine, so that instructions capable of being executed by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

The above are optional embodiments of the present disclosure. It should be noted that those skilled in the art can make various changes and modifications to the embodiments of the present disclosure without departing from the principle of the present disclosure, which shall also fall within the scope of the present disclosure.

What is claimed is:

1. A handover method performed by a first network device, comprising:
   transmitting a handover request message to a second network device, the handover request message carrying relevant information of a first Multicast Broadcast Service (MBS); and
   receiving a handover request acknowledgement message transmitted by the second network device, the handover request acknowledgement message carrying access control related information of the first MBS;
   wherein the access control related information of the first MBS comprises:

Transmission Network Layer (TNL) address information for data forwarding;
   the handover method further comprises:
   receiving data of the first MBS transmitted by a core network device;
   forwarding the data of the first MBS received from the core network device to the second network device in accordance with the TNL address information for data forwarding in the handover request acknowledgement message;
   wherein when user plane resource between the second network device and the core network is not established by the second network device or does not exist, the second network device triggers to setup the user plane resource between the second network device and the core network device for the MBS session.

2. The handover method according to claim 1, wherein the first MBS comprises at least one of: an MBS requested by the first network device to be established, an MBS being currently transmitted or joined by a terminal, or an MBS in which the terminal is interested.

3. The handover method according to claim 1, further comprising:
   transmitting a handover command to the terminal, and stopping transmitting data of the first MBS to the terminal, wherein the handover command is used for instructing the terminal to hand over to the second network device.

4. The handover method according to claim 1, wherein the relevant information of the first MBS comprises at least one of:
   Quality of Service (QoS) flow information of the first MBS;
   service identification information of the first MBS;
   identification information of a first MBS group;
   session information of the first MBS;
   a transmission mode adopted by the first network device for the first MBS;
   a transmission mode expected or selected by the terminal.

5. The handover method according to claim 1, wherein the access control related information of the first MBS further comprises at least one of:
   a QoS flow for an accepted first MBS;
   session information of the accepted first MBS;
   a QoS flow for an unaccepted first MBS;
   session information of the unaccepted first MBS;
   a transmission mode of the first MBS.

6. The handover method according to claim 4, wherein the transmission mode comprises at least one of:
   a unicast transmission mode;
   a multicast transmission mode;
   a point-to-point transmission mode;
   a point-to-multipoint transmission mode.

7. The handover method according to claim 1, further comprising:
   receiving a end marker transmitted by the core network device, the end marker being used to indicate that data transmission of the first MBS for the first network device is ended.

8. The handover method according to claim 7, wherein the receiving the end marker transmitted by the core network device comprises:
   receiving a tunnel header of an MBS session transmitted by the core network device, the tunnel header of the MBS session carrying the end marker; and/or receiving a tunnel header of a unicast session transmitted by the core network device, the tunnel header of the unicast session carrying the end marker.

9. The handover method according to claim 8, wherein the tunnel header of the MBS session further carries user identification information.

10. The handover method according to claim 7, further comprising:

transmitting the end marker received from the core network device to the second network device.

11. A network device, which is a first network device comprising a processor and a transceiver, wherein the transceiver is configured to transmit and receive data under the control of the processor, wherein the processor is configured to implement the handover method according to claim 1.

12. A handover method performed by a second network device, comprising:

receiving a handover request message transmitted by a first network device, the handover request message carrying relevant information of a first MBS;

transmitting a handover request acknowledgement message to the first network device, the handover request acknowledgement message carrying access control related information of the first MBS;

wherein the access control related information of the first MBS comprises:

Transmission Network Layer (TNL) address information for data forwarding-;

receiving data of the first MBS that is received by the first network device from the core network device and forwarded by the first network device in accordance with the TNL address information for data forwarding;

wherein when determining user plane resource between the second network device and the core network is not established by the second network device or does not exist, the handover method further comprises:

triggering to setup the user plane resource between the second network device and the core network device for the MBS session.

13. The handover method according to claim 12, wherein the triggering the core network device to setup the user plane resource from the second network device to the core network device comprises:

transmitting user plane resource request message between the second network device and the core network device, the user plane resource request message carrying at least one of the relevant information of the first MBS, a handover instruction or a transmission network layer address of the second network device;

receiving a user plane resource request reply message transmitted by the core network device.

14. A network device, which is a second network device comprising a processor and a transceiver, wherein the transceiver is configured to receive and transmit data under the control of the processor, wherein the processor is configured to implement the handover method according to claim 12.

* * * * *